United States Patent [19]

Nagashima et al.

[11] Patent Number: 4,787,924
[45] Date of Patent: Nov. 29, 1988

[54] AIR CLEANER

[75] Inventors: Akira Nagashima, Kawasaki; Keisuke Ishii, Tokyo, both of Japan

[73] Assignee: Kioritz Corporation, Tokyo, Japan

[21] Appl. No.: 129,317

[22] Filed: Dec. 3, 1987

[30] Foreign Application Priority Data

Dec. 9, 1986 [JP] Japan .................. 61-189689[U]

[51] Int. Cl.$^4$ .................................... B01D 46/00
[52] U.S. Cl. .................... 55/385.1; 55/419; 30/383; 123/198 E; 123/556
[58] Field of Search ............. 55/385 R, 385 B, 510, 55/419; 30/383; 123/198 E, 195 C, 556

[56] References Cited

U.S. PATENT DOCUMENTS

| 2,571,828 | 10/1951 | Brezek | 123/556 |
| 4,548,169 | 10/1985 | Nagashima | 123/195 C |
| 4,592,445 | 6/1986 | Sawada | 181/229 |
| 4,626,266 | 12/1986 | Sasaki | 55/385 R |

FOREIGN PATENT DOCUMENTS 1534765 12/1978 United Kingdom ............ 123/556

Primary Examiner—Bernard Nozick
Attorney, Agent, or Firm—Browdy and Neimark

[57] ABSTRACT

An air cleaner includes closure means comprised of a partition wall integrally formed on one side of a filter member, which closure means will selectively shut either a first air-intake port for sucking outside air into a filtration room or a second air-intake port to suck air into the filtration room through an engine room. One of these first and second air-intake ports is selectively closed by a partition wall by turning the positioning of the filter member.

3 Claims, 2 Drawing Sheets

AIR CLEANER

BACKGROUND OF THE INVENTION

This invention relates to an air cleaner for cleaning air supplied to a carburetor for an internal combustion engine and, more particularly, to an air cleaner suitable for application to portable working machines such as a chain saw.

DESCRIPTION OF THE PRIOR ART

Conventionally, for example in a chain saw, an internal combustion engine is incorporated as a power source within an engine room of the chain saw, a carburetor is located in a carburetor chamber adjacent to the engine room causing air-fuel mixture to be sucked through an intake duct into the internal combustion engine, and an air cleaner is located neighboring the carburetor chamber to suck outside air into a filtration room of the air cleaner. This sucked outside air is filtered when passing through a filter member and is introduced into the carburetor chamber supplying it to the carburetor. In such a conventional air cleaner as mentioned above, when the chain saw is employed under high temperature weather conditions, the outside air is directly sucked into the filter chamber through a first air-intake port provided on a location opposite to the engine room and opening outwardly, while closing a second air-intake port in order to stop inflow of relatively high temperature air from the engine room into the filtration room. On the contrary when the chain saw is used under cold weather conditions, the first air-intake port is in turn closed while the second air-intake port is opened so that hot air which has increased in temperature from flowing around the internal combustion engine within the engine room is introduced into the filtration room. As typical conventional means for selectively closing one of the first and second air-intake ports in this manner, various means are well known, which include a structure to close the opening of one of air-intake ports with a rubber plug, a structure providing shutters at the respective air-intake ports, when one of which is opened the other is closed or vice versa, or a structure having blind plugs provided on each of the air-intake ports, which replace each other to open one of the holes and to close the other hole alternately.

In these conventional air cleaners, means for selectively closing the air-intake ports often require a relatively large number of components and this causes the structure to become relatively complicated.

SUMMARY OF THE INVENTION

Accordingly, one object of the present invention is to solve the problems in conventional air cleaners, and to provide a novel air cleaner having a structure so simple as to be readily operable.

In order to resolve the problems explained previously, an air cleaner according to the present invention is characterized in that the air cleaner comprises a first air-intake port to suck outside air into a filtration room, a second air-intake port to suck air through the engine room, and closure means for selectively closing one of the first or second air-intake ports, and that the closure means are comprised of a partition wall integrally formed on one side of the filter member, and one of these first and second air-intake ports is selectively closed with the partition wall by turning the direction of the filter member.

According to the structure as has been described, it is thus possible to selectively close one of the air-intake ports and introduce the air having a proper temperature into the filtration room by merely turning the direction of the filter member.

In this manner, the present invention can decrease the number of components to simplify a switching structure for sucking air enabling the air cleaner to be manufactured at a low price, and handling and maintenance to be done without difficulty.

DESCRIPTION OF THE PREFERRED EMBODIMENT

The present invention will be fully described hereinafter with reference to the drawings showing one preferred embodiment.

Figure 1:
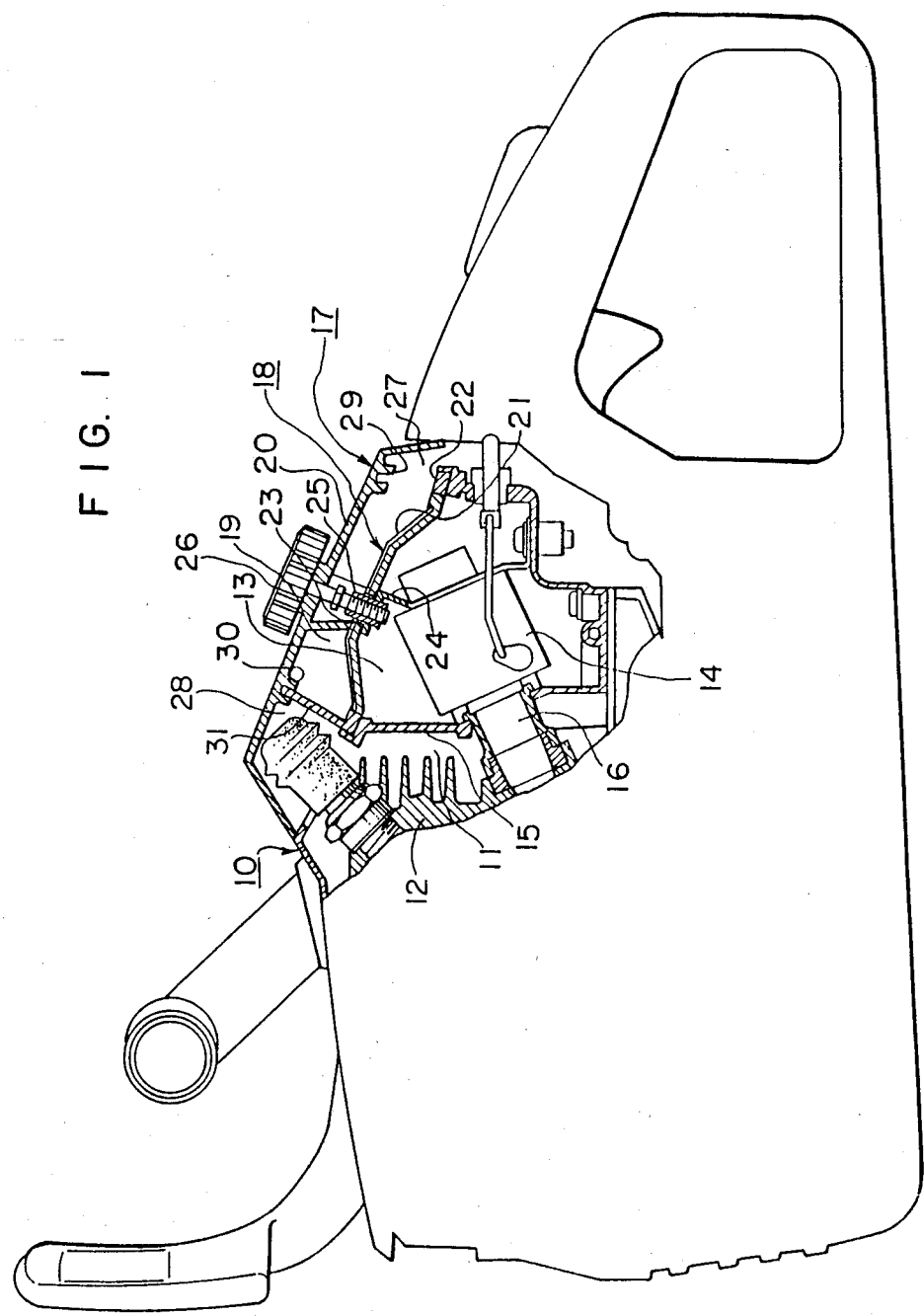
FIG. 1 is a cross-sectional view showing the main part of a chain saw incorporating thereinto one embodiment of an air cleaner according to the present invention.
Figure 2:
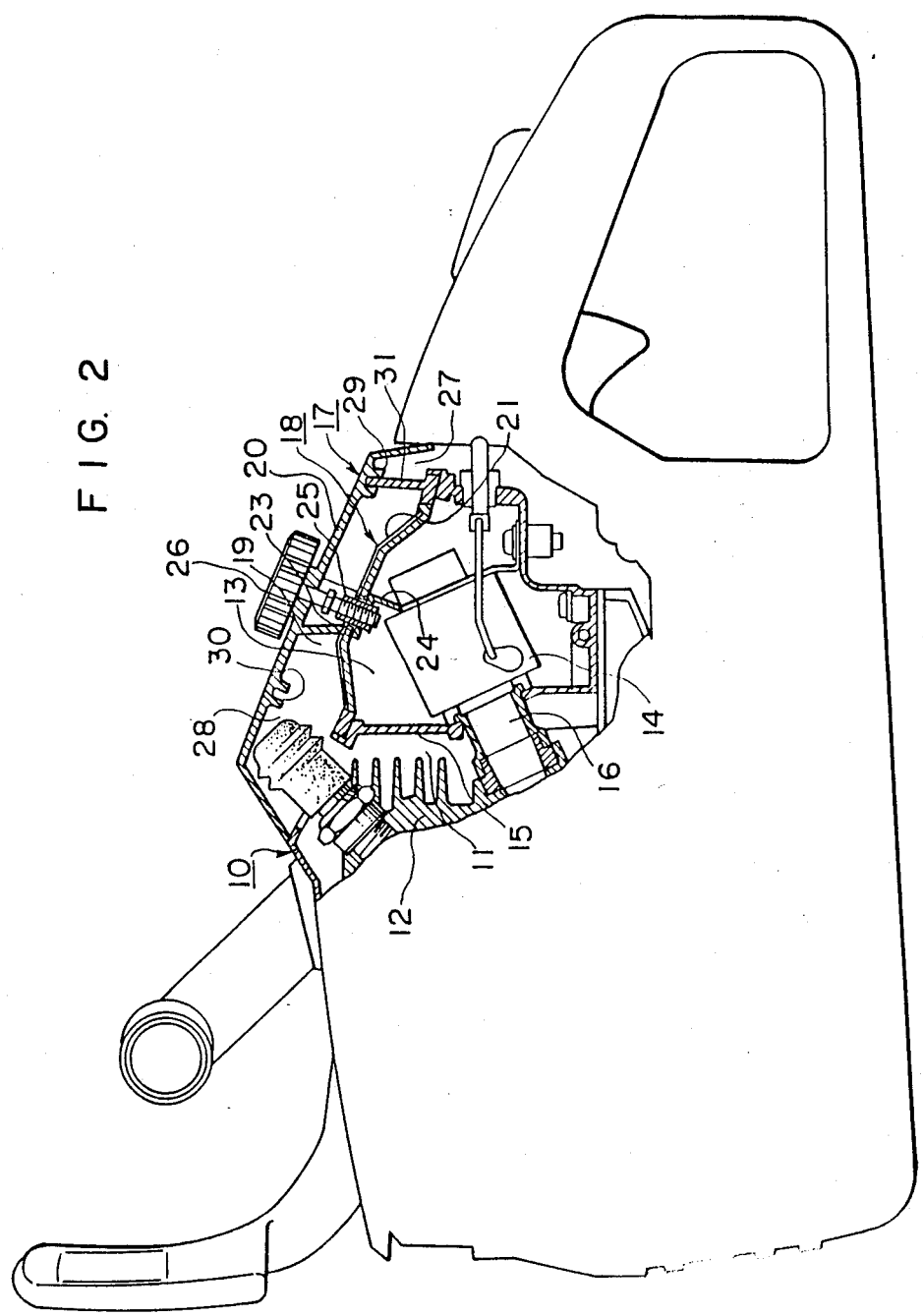
FIG. 2 is a cross-sectional view illustrating the same filter member taking the other selective position different from FIG. 1.

One embodiment illustrated in FIGS. 1 and 2 is an example in which the invention is applied to a chain saw. Within the main body 10 of this chain saw an internal combustion engine 12 is incorporated as a power source, and a carburetor 14 is disposed within a carburetor chamber 13. The carburetor chamber 13 is defined by an heat insulation wall 15 for isolating the carburetor 14 from the surrounding heat source, especially from heat radiation from the internal combustion engine 12. The carburetor 14 is connected through a tube 16 penetrating the insulation wall 15 to the internal combustion engine 12 for supplying the air-fuel mixture to the internal combustion engine 12.

An air cleaner 17 is disposed above the carburetor chamber 13. This air cleaner 17 is provided with a filter member 18 with a plate-like configuration which is symmetrically formed in the machine's forward and rearward direction, or leftward and rightward as viewed in FIG. 1, and a cover member 20 defining together with the filter member 18 a filtration room 19 which is located above the filter member 18. The filter member 18, which may be integrally molded from synthetic resins, includes a filter element 21 for cleaning air passing therethrough and a framework 22 extending along the outer periphery of the filter element 21 to be held. The framework 22 is mounted on the upper edge surface of the peripheral wall around the carburetor chamber 13. Furthermore, the filter element 21 is supported at the central portion 23 thereof on the upper end portion of a bracket 24 protruding upwardly from the carburetor. Fixed on the upper end portion of the bracket 24 is a nut member 25 which extends through the central portion 23 of the filter member 18. Further, the air cleaner 17 includes a screw member 26 which passes through the cover member 20 from its upper side and extends downwardly within the filtration room 19. The screw member 26 is screwed into the nut member 25 for press-fastening the cover member 20 onto the upper portion of the main body 10 of the chain saw and clamping the filter member 18 against the upper end surface of the peripheral wall of the carburetor chamber 13.

An engine room 11 is defined by the insulation wall 15 and the body 10, surrounding the internal combustion engine 12 and on one side of an air cleaner 17. The air cleaner 17 is formed with a first air-intake port 27 opening outwardly at a side of the air cleaner 17 opposite to the engine room 11 for directly introducing outside air into the filtration room 19, and with a second air-intake port 28 opening at a side adjacent to and toward the engine room 11. The cover member 20 is also provided with a laterally extending first groove 29 which is formed at a location inside of the first air intake port 27, and with a laterally extending second groove 30 which is similarly formed at a location inside of the second air intake port 28. In the meantime the filter member 18 is integrally formed at one of the frontward and rearward end portions with a partition wall 31 protruding upwardly. This partition wall 31 engages at its upper edge portion with the second groove 30 of the cover member 20 to close the second air intake port 28 when the filter member 18 is mounted in such a position as shown in FIG. 1, so that the communication between the filtration room 19 and the engine room 11 is cut off. The outside air can be introduced into the filtration room 19 only through the first air-intake port 27. In contrast, when the filter member 18 is turned back to front at an angle of 180 degrees and takes the position shown in FIG. 2, the upper edge portion of the partition wall 31 is fit into the first groove 29 of the cover member 20 to shut the first air-intake port 27, so that the direct connection between the filtration room 19 and the outside is intercepted to intrdduce only hot air within the engine room 11 into the filtration room 19. The alternating of the filter positioning is readily carried out by loosening the screw member 26, removing the cover 20 and turning the filter member 18. In this manner the outside air or the hot air within the engine room 11 can be selectively supplied to te filtration room 19. This supplied air flows through the filter element 21 of the filter member 18 while being filtered and sucked into the carburetor 14. Further, the partition wall 31 serves as a pick-up member during removal or alternating the positioning of the filter member 18. When the chain saw is operated under high temperature weather conditions, the second air-intake port 28 is closed as disclosed in the foregoing descriptions by the partition wall 31 on the framework 22 of the filter member 18 so as to allow only the outside air into the filtration room 19 through the first air-intake port 27. However when this chain saw is employed under cold-weather conditions and there is the possibility of icing in the carburetor 14, the first air-intake port 27 is shut with the partition wall 31 as has been described, and in this case the hot air flowing around and heated by the internal combustion engine 12 within the engine room 11 is taken through the air-intake port 28 in the filtration room 19.

What is claimed is:

1. An air cleaner for cleaning air and supplying it to a carburetor of an internal combustion engine through an air inlet, the carburetor being disposed in a carburetor chamber, said air cleaner adapted to be disposed within a machine body, said air cleaner comprising:
    a filter member rotatably supported on an upper edge surface of a peripheral wall around the carburetor chamber;
    a cover member provided above said filter member so as to define a filteration room therebetween;
    a first air-intake port to suck air from outside the machine body into the filtration room;
    a second air-intake port to such air from an engine room into the filtration room; and
    closure means for selectively closing either of the first and second air-intake ports, said closure means comprising an upwardly protruding partition wall integrally formed on one side of the filter member, wherein one of said first and second-air intake ports is selectively closed by said partition wall by turning the position of the filter member.

2. An air cleaner according to claim 1, further comprising means for alternating the positioning of said filter member comprising a screw member which extends through the cover member from the upper side of said cover member, said screw member being adapted to rotate and clamp the filter member against a peripheral wall of a chamber housing the carburetor.

3. An air cleaner according to claim 1, wherein said cover member comprises a laterally extending first groove formed at a location inside first air-intake port and a laterally extending second groove formed at a location inside and second air-intake port, such that said filter member is adapted to rotate between a first position wherein said upwardly protruding partition wall in engaged with said first groove to block said first intake port and allow air to pass through said second intake port and a second position wherein said upwardly protruding partition wall is engaged with said first groove to block said second intake port and allow air to pass through said first intake port.

* * * * *